Figure 5:
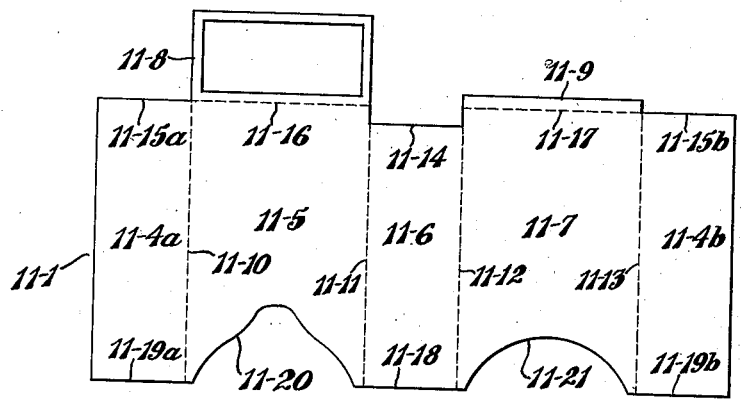

Jan. 30, 1945.   R. E. McCLURE   2,368,480
STEREOSCOPE
Filed Nov. 7, 1941   3 Sheets—Sheet 1
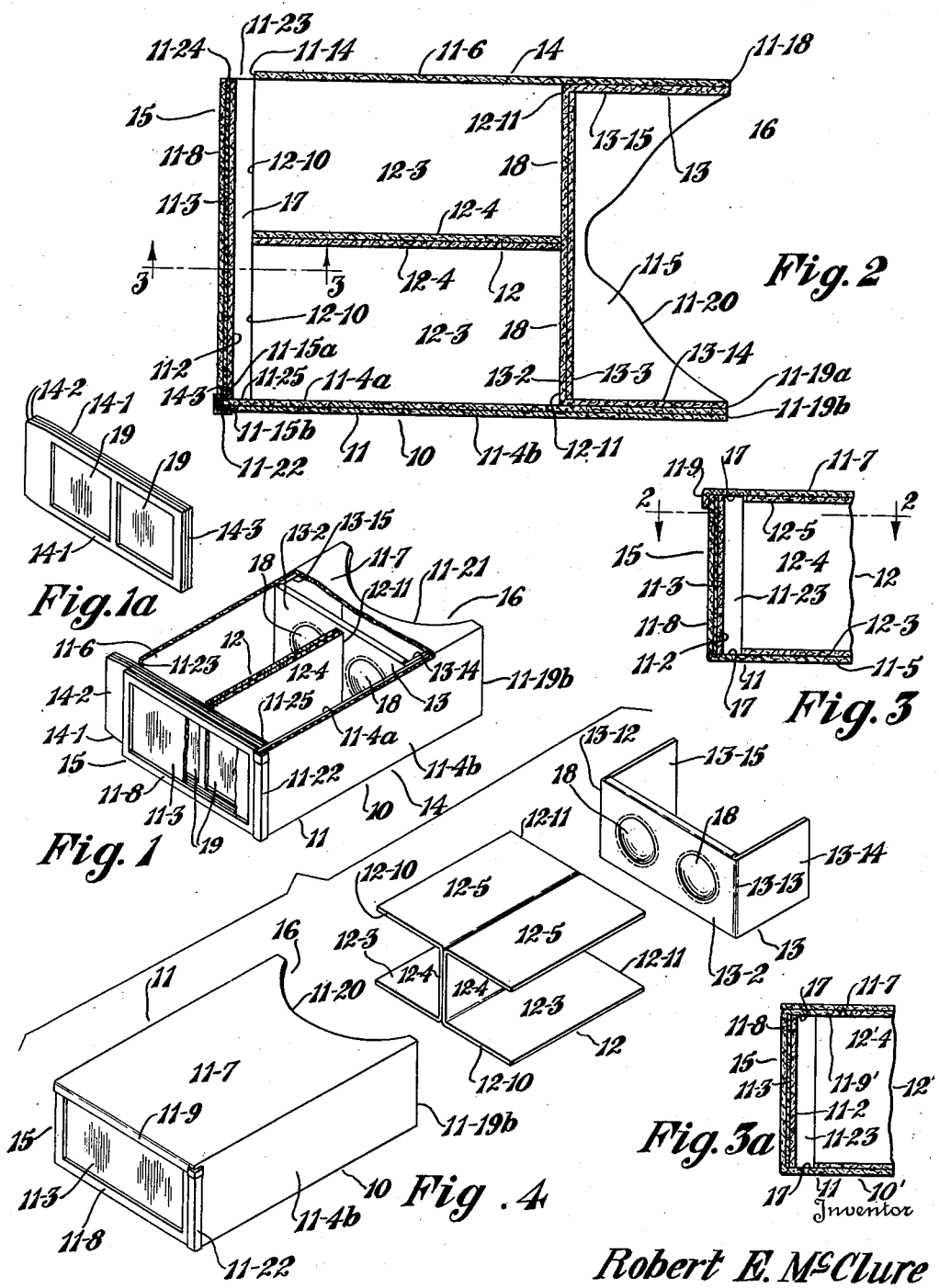
Inventor
Robert E. McClure
By Frease and Bishop
Attorneys Jan. 30, 1945.                R. E. McCLURE                    2,368,480
                                STEREOSCOPE
                             Filed Nov. 7, 1941              3 Sheets-Sheet 2

Inventor
Robert E. McClure
By Fraser and Bishop
Attorneys

Jan. 30, 1945.  R. E. McCLURE  2,368,480
STEREOSCOPE
Filed Nov. 7, 1941  3 Sheets-Sheet 3

Inventor
Robert E. McClure
By Firead and Bishop
Attorneys

Patented Jan. 30, 1945

2,368,480

UNITED STATES PATENT OFFICE 2,368,480

STEREOSCOPE

Robert E. McClure, Warren, Ohio

Application November 7, 1941, Serial No. 418,203

16 Claims. (Cl. 88—29)

My invention relates to stereoscopes adapted for viewing pairs of stereoscopic pictures, and more particularly stereoscopic color transparencies, preferably the 2¼" x 2¼" size.

Manufacturers of articles in color, particularly for use in homes, such as colored wall and floor coverings including wall paper, paint, rugs, carpet, linoleum, tile, and the like, and such as curtains, drapes, furniture, and ornaments, and such as dinnerware, enameled kitchenware, and dining and kitchen utensils, and articles such as white enameled kitchen cabinets, sinks, stoves, and refrigerators, usually used in conjunction with colored wall and floor coverings, curtains, drapes, furniture, and ornaments, have a difficult problem in showing in three dimensional form the articles in their various color combinations to prospective purchasers.

Numerous attempts have been made to provide stereoscopes for this purpose, but such stereoscopes have either been only suited for the relatively small 35 millimeter color transparencies which are not of satisfactory size when viewed directly, or have been relatively complicated and expensive to make, precluding their use in large numbers.

The 2¼" x 2¼" stereographic color transparencies are a very satisfactory size for direct viewing, but require a stereoscope designed particularly for the proper illumination of the transparencies, and the transmission of the light passing through the transparencies to the eyes of the viewer.

It is desirable to use daylight as a source of illumination when daylight is available in suitable intensity. When daylight of suitable intensity is not available, it is desirable to have a source of artificial light. Stereoscopes available prior to the present improvements have not generally been adapted for illumination as desired either by daylight, or by artificial light.

From another standpoint in a stereoscope adapted for mass production, it is desirable to make the parts as much as possible from non-metallic sheet material such as paper, cardboard, cellular paper boxboard, and the like, which is lighter and easier to work than metallic sheet material of the same thickness necessary to give the desired stiffness and strength to the parts.

In use, a stereoscope including parts most of which are made of non-metallic sheet material, such as paper, cardboard, cellular paper boxboard, and the like, is light as well as stiff and strong, and it is easier for a salesman to carry than when made of heavier metal of equal stiffness and strength.

The objects of the present invention include the provision of an improved stereoscope and the like, particularly adapted for direct viewing of 2¼" x 2¼" stereographic color transparency slides, using daylight as a source of illumination when daylight is available in suitable intensity.

Further objects of the present invention include the provision of such an improved stereoscope with a removable source of artificial light.

Further objects of the present invention include the provision of such an improved stereoscope particularly adapted for being made of non-metallic sheet material, such as paper, cardboard, cellular paper boxboard, and the like, which is lighter and easier to work than metallic sheet material of the same thickness. Moreover such non-metallic sheet material is frequently more generally available than metallic sheet material.

Further objects of the present invention include the provision of an improved stereoscope of simplified construction and arrangement, and adapted for easy and economical manufacture and maintenance, regardless of the material of which it is made.

The foregoing and other objects are attained by the stereoscopes, constructions, parts, combinations, and sub-combinations comprising the present invention, the nature of which is set forth in the following general statement, preferred embodiments of which are set forth in the following description, and which are particularly and distinctly pointed out and set forth in the appended claims forming part hereof.

The nature of the improved stereoscope of the present invention may be stated in general terms as including an outer box sub-assembly, an inner divider sub-assembly, and an inner lens mount sub-assembly, each sub-assembly including parts made from formed blanks of sheet material, preferably non-metallic sheet material such as paper, cardboard, cellular paper boxboard, and the like.

Each of the sub-assemblies may be quickly and conveniently made, and the sub-assemblies interfit and telescope with each other to produce the complete stereoscope in a manner permitting very rapid and economical manufacture, and in such a way as to produce an easily operated and convenient stereoscope.

The improved stereoscope is particularly adapted for viewing stereographic color transparency slides, and is provided in an improved manner with a light diffusing sheet at its admitting end.

The stereoscope may thus be used with daylight as a source of light whenever daylight is available and in suitable intensity.

When necessary however the improved stereoscope is provided with an improved removable source of artificial light, including a housing adapted for telescoping on the light admitting end of the stereoscope and having operatively mounted therein one or more electric lights.

Figure 6:
Figure 8:
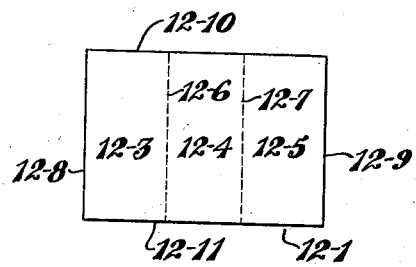
Figure 7:
Figure 10:
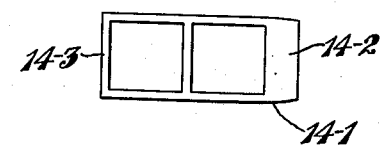
Figure 9:
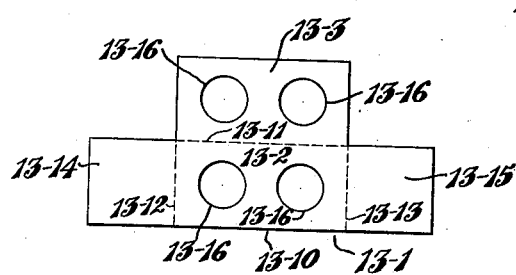
Figure 12:
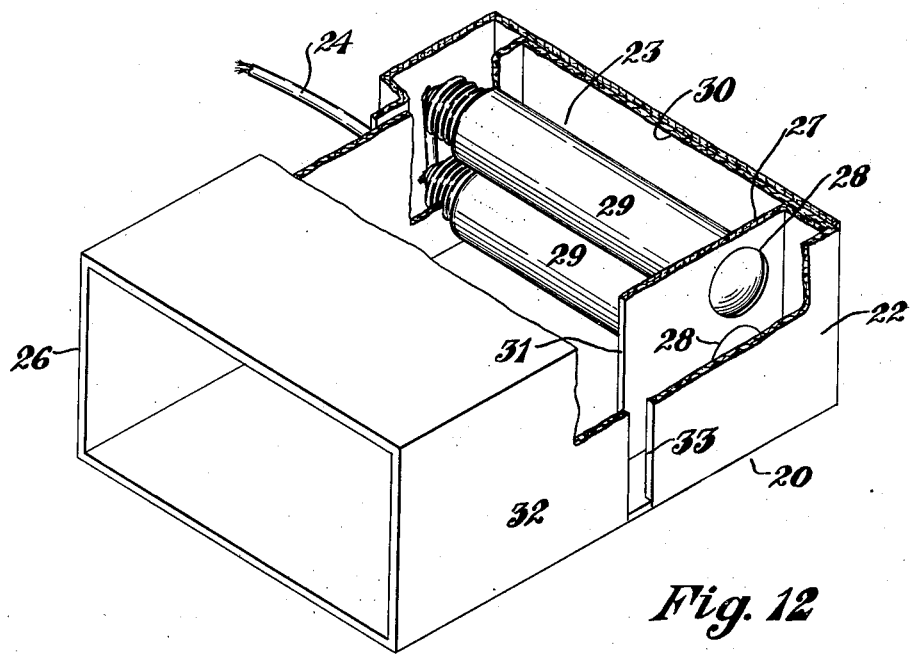
Figures 11, 13:
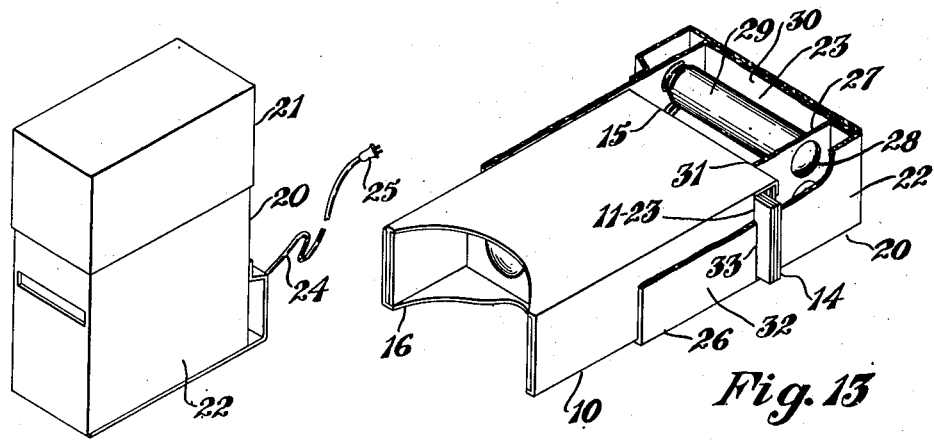

By way of example, preferred embodiments of the improved stereoscope and parts thereof are illustrated in the accompanying drawings forming part hereof, in which Figure 1 is an isometric view of the improved stereoscope with a stereographic color transparency slide inserted, portions of the top wall of the stereoscope outer box and other walls being shown in section and being cut away;

Fig. 1a, an isometric view of one of the stereographic color transparency slides for use with the improved stereoscope;

Fig. 2, an enlarged plan sectional view thereof with the slide removed, as on line 2—2, Fig. 3;

Fig. 3, a fragmentary longitudinal sectional view thereof, as on line 3—3, Fig. 2;

Fig. 3a, a view similar to Fig. 3, illustrating a modified embodiment of the improved stereoscope;

Fig. 4, disassembled isometric views of the three subassemblies of the improved stereoscope;

Fig. 5, a plan view of a preferred form of blank for the box sub-assembly of the improved stereoscope;

Fig. 6, a plan view of a blank for a diffusing sheet frame;

Fig. 7, a plan view of a diffusing sheet;

Fig. 8, a plan view of a blank for one of the two parts of the divider sub-assembly of the improved stereoscope;

Fig. 9, a plan view of a blank for the lens mount sub-assembly for the improved stereoscope;

Fig. 10, a plan view of one of the mounts which may be used for making the stereographic color transparency slides particularly adapted for use with the improved stereoscope;

Fig. 11, a view of an improved removable artificial light unit for the improved stereoscope showing a cover thereon;

Fig. 12, an enlarged isometric view of the light unit in its position ready for use, portions being broken away and shown in section; and Fig. 13, a smaller view similar to Fig. 12 showing the improved light unit in use on the improved stereoscope.

Similar numerals refer to similar parts throughout the several views.

The improved stereoscope is indicated generally by 10, and includes three sub-assemblies, an outer box sub-assembly 11, an inner divider sub-assembly 12, and an inner lens mount sub-assembly 13, shown disassembled in Fig. 4.

Each of the sub-assemblies includes one or more blanks preferably made of light non-metallic sheet material such as paper, cardboard, cellular paper boxboard, and the like.

One form of blank 11—1 for the box sub-assembly 11 is shown in Fig. 5 and is preferably made of cardboard, or cellular paper boxboard.

Likewise for the box sub-assembly 11, a light diffusing sheet frame blank 11—2, preferably made of cardboard or heavy paper is shown in Fig. 6, and a light diffusing sheet 11—3, which may be made of any material adapted for diffusing transmitted light, such as sanded Cellophane, or diffusing glass, is shown in Fig. 7.

For the divider sub-assembly 12, a rectangular blank 12—1 is shown in Fig. 8 and may be made of cardboard or heavy paper.

For the lens mount sub-assembly 13, a blank 13—1 is shown in Fig. 9, and may be made of cardboard or heavy paper.

For the stereographic transparency mount 14, particularly adapted for use with the stereoscope 10, a blank 14—1 is shown in Fig. 10, and may be made of cardboard or heavy paper.

Fold lines are indicated by dash lines in the blanks 11—1, 12—1, and 13—1.

The blank 11—1 includes from left to right as shown in Fig. 5, a box side wall 11—4a, a box bottom wall 11—5, a box side wall 11—6, a box top wall 11—7, and a box side wall 11—4b.

From one end of the box bottom wall 11—5 extends a light diffusing sheet frame 11—8.

At the same end of the box top wall 11—7 extends a connector flap 11—9.

The side walls 11—4a and 11—4b, are at the opposite ends of the blank 11—1, and are rectangular, and the side wall 11—4a is adapted for folding on the straight common side fold line 11—10 between adjacent sides of the walls 11—4a and 11—5.

At the other side of the box bottom wall 11—5, parallel with the fold line 11—10, there is a common side fold line 11—11 between the box bottom wall 11—5 and the box side wall 11—6.

At the other side of the box side wall 11—6, parallel with the fold line 11—11, there is a common side fold line 11—12 between the box side wall 11—6 and the box top wall 11—7.

At the other side of the box top wall 11—7, parallel with the fold line 11—12, there is a common side fold line 11—13 between the box top wall 11—7 and the box side wall 11—4b.

The fold lines 11—10, 11—11, 11—12, and 11—13 are thus parallel with each other.

The side wall 11—6 has an end 11—14 inwardly offset from the similar ends of the blank and of the other three walls of the tube formed from the blank. The similar ends of the outer blank walls 11—4a and 11—4b are 11—15a, and 11—15b, respectively.

The bottom wall 11—5 at one side of the shorter side wall 11—6 has the rectangular diffusing sheet frame 11—8 extending from its similar end, with the end fold line 11—16 between the diffusing sheet frame 11—8 and the bottom wall 11—5.

At the other side of the shorter side wall 11—6, the top wall 11—7 has the connector flap 11—9 extending from its similar end, and the end fold line 11—17 is between the flap 11—9 and the top wall 11—7.

After forming all the fold lines become bounding edges of their several walls, and the end fold lines 11—16 and 11—17 are thus the ends respectively of the walls 11—5 and 11—7, and are alined with the outer wall ends 11—15a and 11—15b.

The opposite ends 11—18, 11—19a, and 11—19b of the walls 11—6, 11—4a, and 11—4b, respectively, are alined with each other, whereas the similar end of the bottom wall 11—5 is a reversely concavely curved end 11—20 for accommodating the nose of the viewer, and the similar end of the top wall 11—7 is an arcuately curved end 11—21 for accommodating the forehead of the viewer.

The blank 11—1, in conjunction with the light diffusing sheet frame blank 11—2 which is rectangular and matches the rectangular frame 11—8 on the blank 11—1, and the light diffusing sheet 11—3, are utilized to make the outer box sub-assembly 11, by folding the blank 11—1 on the several fold lines and lapping the side wall 11—4b over the side wall 11—4a, or vice versa, the walls 11—4a and 11—4b being the outer walls of the blank and being connected with each other as by gluing as is common in paper and cardboard box manufacturing, or by wire stapling, as may be desired.

The light diffusing sheet 11—3 is layed preferably on the top of the frame 11—8 as shown on the plan view in Fig. 5, and the borders of the light diffusing sheet 11—3 are secured as by gluing to the frame 11—8, and preferably the frame blank 11—2 is secured as by gluing on the other side of the light diffusing sheet 11—3.

The frame 11—8 with the light diffusing sheet 11—3 mounted thereon, after being swung up to the vertical position as shown in Figs. 3 and 4, is overlapped by the connector flap 11—9, the outer border of the frame 11—8 being connected as by gluing with the connector flap 11—9.

In the modified embodiment of the stereoscope indicated generally by 10' in Fig. 3a, the connector flap 11—9 is eliminated on the top wall 11—7, and a connector flap 11—9' is provided on the end of the frame 11—8, and is inserted beneath the top wall 11—7, the divider subassembly 12' being notched as shown in Fig. 3a, to accommodate the flap 11—9'.

Additionally, one side of the frame 11—8 may be and preferably is secured to the end 11—15b of the outer side wall 11—4b as by an adhesive tape 11—22.

In the blank 11—1 the inwardly offset end wall 11—14 of the side wall 11—6 forms with the longer walls on each side thereof a notch between the adjacent longer walls for providing a stereographic transparency slide entrance 11—23 in the finished stereoscope, as best shown in Fig. 2.

The notch 11—23 is broadly a slide entrance formed in the side wall 11—14 and for the mere purpose of an entrance might be a slot.

For other purposes of the invention, a slot entrance 11—23 is provided by the notch and the adjacent edge 11—24 of the assemblage of the frame 11—8, the sheet 11—3, and the frame 11—2.

The end portion 11—25 of the inner connector side wall 11—4a opposite the entrance 11—23 operates as a stop for the slides used in the improved stereoscope.

The overlapping and connected side walls 11—4a and 11—4b constitute a composite side wall in the completed stereoscope, and this composite side wall provides the slide stop 11—25 opposite the slide entrance 11—23, regardless of which of the walls 11—4a and 11—4b is inside.

Moreover, the inside wall might be cut away and the outer wall 11—4b would then provide the stop portion 11—25, which would still be in the side wall of the box 11 opposite the entrance 11—23.

The blank 11—1 in the completed subassembly 11 constitutes a formed piece of sheet material having walls on opposite sides of fold lines forming a rectangular tube indicated generally by 14 having the top and bottom walls 11—7 and 11—5, the side wall 11—6 and the opposite composite side wall including the overlapping walls 11—4a and 11—4b.

The tube 14 has a light admitting end 15 and a viewing end 16, and the frames 11—8 and 11—2 with the light diffusing sheet 11—3 secured therebetween, are at the light admitting end 15 of the tube 14.

The blank 12—1 for the divider sub-assembly 12 is rectangular and includes from left to right in Fig. 8, three rectangular walls 12—3, 12—4, and 12—5, the rectangular walls 12—3 and 12—4 having a fold line 12—6 therebetween and the walls 12—4 and 12—5 having a fold line 12—7 therebetween, and the fold lines 12—6 and 12—7 are parallel with each other and with the outer sides 12—8 and 12—9 of the rectangular blank 12—1.

The ends of the walls 12—3, 12—4 and 12—5 are respectively in the opposite ends 12—10 and 12—11 of the blank 12—1.

In making the sub-assembly 12 a pair of the blanks 12—1 are folded on their fold lines to constitute formed pieces of sheet material each having walls on opposite sides of fold lines, the formed pieces of sheet material being deep channels in shape.

In the complete divider sub-assembly 12, the base walls 12—4 of each channel abut each other and are secured to each other as by gluing. These connected walls 12—4 constitute a composite partition, which with the flange walls 12—3 and 12—5 of the back to back base connected channels fit and telescope within the rectangular tube walls.

The ends 12—10 of the walls of the subassembly 12 are preferably unobstructingly alined with the entrance 11—23, that is the ends 12—10 are alined with the offset end 11—14 of the box or top side wall 11—6 in the completed stereoscope as best shown in Fig. 2.

The common ends 12—10 of the walls of the sub-assembly 12 alined with the end 11—14 of the box or tube side wall 11—6 form a guide for a sterographic transparency slide inserted through the entrance 11—23.

Moreover the common ends 12—10 of the divider sub-assembly walls 12—3 and 12—5 form with the adjacent and opposite walls of the frame 11—2 upper and lower slide guide grooves 17, best shown in Figs. 2 and 3.

The blank 13—1 for the lens mount subassembly 13, as shown in Fig. 9, includes a rectangular lens mount and closure wall 13—2 bounded by a bottom side 13—10 of the blank 13—1, an opposite parallel fold line 13—11, and opposite spaced end fold lines 13—12 and 13—13.

At the outer side of the end fold line 13—12 extends a connector flap wall 13—14, and at the outer side of the end fold line 13—13 extends a connector flap wall 13—15.

Beyond the side fold line 13—11 preferably extends a second lens mount closure wall 13—3. Each of the walls 13—2 and 13—3 has a pair of lens apertures 13—16 formed therein which are adapted to register with each other in making the completed sub-assembly 13 as shown in Fig. 4.

The completed sub-assembly 13 includes a lens 18 which is laid upon each aperture 13—16 of the blank 13—1, and the lens mount closure wall 13—3 is folded over the fold line 13—11 and secured as by gluing to the opposite face of the wall 13—2 mounting the lenses 18 therebetween, one in each pair of registering apertures 13—16.

The walls 13—14 and 13—15 are then folded in the same direction on the fold lines 13—12 and 13—15 to form the rectangular sub-assembly 13.

The sub-assembly 13 as made thus includes a formed piece of sheet material made from the blank 13—1, and having walls on opposite sides of fold lines, and the sub-assembly 13 generally is in the shape of a channel running upwards and downwards as distinguished from the longitudinally extending channels of the sub-assembly 12.

In the complete stereoscope 10, the sub-assembly 13 is telescoped and fits within the viewing end of the rectangular tube 14 of the box 11 preferably with the lens mount and closure formed by the walls 13—2 and 13—3 in abutment with the viewing end of the partition walls 12—4 of the sub-assembly 12, and with the connector walls 13—14 and 13—15 secured to the box or tube side walls.

The partition formed by the abutting walls 12—4 thus extends longitudinally in the tube 11—6 and divides the same into side by side light compartments, the viewing end of which is provided with a closure by the lens mount and closure 13—2.

On the outside of the lens mount and closure formed by the walls 13—2 and 13—3 the interior of the tube comprises a hood for obstructing light reaching the eyes of the viewer using the stereoscope 10, except through the stereoscope.

For making a stereographic preferably color transparency slide 14 for use with the stereoscope 10, a pair of stereoscope transparencies 19 are glued or otherwise secured between the double frame mount blanks 14—1, each transparency being in the opening of one of the frames. Each mount 14—1 as shown has a handle extension 14—2 by which the slide may be grasped between the thumb and fingers of the viewer, in handling the slide.

In using the stereoscope 10, with daylight of suitable intensity, a slide is inserted through the entrance 11—23 until its stop end 14—3 abuts against the stop portion 11—25 of the side wall 11—4a as shown in Fig. 1. The two stereographic transparencies 19 are then located at the viewing end of one of the light compartments within the tube of the box 11, opposite one of the lenses 18, which as shown is a fixed focus lens. The viewing end is directed towards the daylight and the viewer looking from the viewing end of the stereoscope 10 through the lenses 18 sees a three dimensional image, which when the stereographic transparencies are 2¼" x 2¼" is very satisfactory in size for advertising purposes.

When daylight of suitable intensity is not available the stereoscope 10 is preferably provided with an artificial light unit illustrated in Figs. 11, 12, and 13, and indicated generally by 20, and which is generally rectangular in shape, and which may have a rectangular cover indicated generally by 21 for protecting its interior when not in use.

The details of construction of the light unit 20 are best shown in Fig. 12, and the unit 20 preferably includes walls forming a housing indicated generally by 22 and having operatively mounted within its interior an electric light source indicated generally by 23 which may be powered as through a cable 24 and plug 25 by connection of the plug 25 with a suitable electric light outlet.

The housing 22 has a rectangular sleeve portion 26 opposite the electric light source 23, and the sleeve portion 26 is adapted for telescoping on the light admitting end 15 of the stereoscope 10.

Within the housing 22 there is preferably provided as shown a support and stop wall 27 which has a pair of apertures 28 therein serving as end supports for the two elongated electric light bulbs 29 which constitute the electric light source 23, as shown. The wall 27 extends from the preferably rectangular base wall 30 of the housing 22 towards the sleeve 26 and terminates in the direction of the sleeve 26 in a stop end 31.

For accommodating the slides 14, the housing 22, which as shown is preferably rectangular, has a side wall 32 in which is provided a slide slot entrance 33 related to the stop end 31, so that when the light unit 20 has its sleeve portion 26 telescoped over the light admitting end 15 of the stereoscope 10, as shown in Fig. 13, the stop end 31 abuts against the diffusing sheet frame 11—8 and the light unit entrance 33 registers with the stereoscope entrance 11—23.

The embodiments of the present improvements illustrated and described herein are by way of example, and the scope of the present invention is not limited to the same or to the particular details thereof, but is commensurate with any and all novel subject matter contained herein which may at any time properly under the patent laws be set forth in the claims hereof or originating herein, and the elements of any such claims are intended to include their functional or structural equivalents.

I claim:

1. In a stereoscope and the like, an outer box sub-assembly, an inner divider sub-assembly, and an inner lens mount sub-assembly; the outer box sub-assembly including walls forming a tube having a light admitting end and an opposite viewing end, a light diffusing sheet extending across and having borders secured to the tube adjacent the light admitting end, and the tube including a side wall having formed therein a stereographic transparency slide entrance adjacent the light diffusing sheet; the divider sub-assembly including walls fitting and telescoping within the tube walls and forming a partition extending longtiudinally in and dividing the tube into side by side longitudinally extending light compartments, the telescoping walls having ends unobstructingly alined with the entrance and constituting a stereographic transparency slide guide; and the lens mount sub-assembly including walls forming a lens mount and closure extending across the tube in abutment with the end of the divider sub-assembly partition adjacent the viewing end of the tube, the lens mount and closure having formed therein a pair of apertures, each aperture being at the viewing end of one of the light compartments, and a lens in each aperture.

2. In a stereoscope and the like, as set forth in claim 1, and in which the walls are made of non-metallic sheet material, which is lighter and easier to work than metallic sheet material of the same thickness.

3. In a stereoscope and the like, an outer box sub-assembly, an inner divider sub-assembly, and an inner lens mount sub-assembly; the outer box sub-assembly including a formed piece of sheet material having walls on opposite sides of fold lines forming a tube having a light admitting end and an opposite viewing end and a light diffusing sheet frame at the light admitting end of the tube, and the tube including a side wall having formed therein a stereographic transparency slide entrance notch adjacent the frame, and a light diffusing sheet having borders secured to the frame; the divider sub-assembly including a pair of formed pieces of sheet material each having walls on opposite sides of fold lines fitting and telescoping within the tube walls and including abutting walls forming a partition extending longitudinally in and dividing the tube into side by side longitudinally extending light compartments, the telescoping walls having ends unobstructingly alined with the entrance and constituting a stereographic transparency slide guide; and the lens mount sub-assembly including a formed piece of sheet material having walls on opposite sides of fold lines forming a lens mount and closure extending across the tube in abutment with the end of the divider sub-assembly partition adjacent the viewing end of the tube and connector flaps telescoping in the tube, the lens mount and closure having formed therein a pair of apertures, each aperture being at the viewing end of one of the light compartments, and a lens in each aperture.

4. In a stereoscope and the like, as set forth in claim 3, and in which the formed pieces of sheet material are non-metallic, and lighter and easier to work than metallic pieces of the same thickness.

5. In a sterescope and the like, an outer box sub-assembly, an inner divider sub-assembly, and an inner lens mount sub-assembly; the outer box sub-assembly including a formed piece of sheet material having walls on opposite sides of fold lines forming a tube having a light admitting end and an opposite viewing end and a light diffusing sheet frame at the light admitting end of the tube, and the tube including a side wall having formed therein a stereographic transparency slide entrance adjacent the frame, and a light diffusing sheet having borders secured to the frame; the divider sub-assembly including a formed piece of sheet material having walls on opposite sides of fold lines fitting and telescoping within the tube walls and including walls forming a partition extending longitudinally in and dividing the tube into side by side longitudinally extending compartments, the telescoping walls having ends unobstructingly alined with the entrance and constituting a stereographic transparency slide guide; and the lens mount sub-assembly including a formed piece of sheet material having walls on opposite sides of fold lines forming a lens mount and closure extending across the tube in abutment with the end of the divider sub-assembly partition adjacent the viewing end of the tube, and connector flaps telescoping in the tube, the lens mount and closure having formed therein a pair of apertures, each aperture being at the viewing end of one of the light compartments, and a lens in each aperture.

6. In a stereoscope and the like, as set forth in claim 5, and in which the formed pieces of sheet material are non-metallic, and lighter and easier to work than metallic pieces of the same thickness.

7. In a stereoscope and the like, an outer box sub-assembly, an inner divider sub-assembly, and an inner lens mount sub-assembly; the outer box sub-assembly including walls forming a tube having a light admitting end and an opposite viewing end, a light diffusing sheet extending across and having borders secured to the tube adjacent the light admitting end, and the tube including a side wall having formed therein a stereographic transparency slide entrance adjacent the light diffusing sheet; the divider sub-assembly including walls forming a partition extending longitudinally in and dividing the tube into side by side longitudinally extending light compartments and forming a stereographic transparency slide guide unobstructingly alined with the entrance; and the lens mount sub-assembly including walls forming a lens mount and closure extending across the tube and the end of the divider sub-assembly partition adjacent the viewing end of the tube, the lens mount and closure having formed therein a pair of apertures, each aperture being at the viewing end of one of the light compartments, and a lens in each aperture.

8. In a stereoscope and the like, as set forth in claim 7, and in which the walls are made of non-metallic sheet material, which is lighter and easier to work than metallic sheet material of the same thickness.

9. In a stereoscope and the like, a tube having a light admitting end and an opposite viewing end, a light diffusing sheet extending across and having borders secured to the tube adjacent the light admitting end, and the tube including a side wall having formed therein a stereographic transparency slide entrance adjacent the light diffusing sheet, a partition dividing the tube into side by side longitudinally extending light compartments terminating within the tube at one end in unobstructing relation with the entrance and at the other end adjacent the viewing end of the tube, a lens mount and closure extending across the viewing end of the light compartments, the lens mount and closure having formed therein a pair of apertures, each aperture being at the viewing end of one of the light compartments, and a lens in each aperture.

10. In a stereoscope and the like, as set forth in claim 9, and in which the tube, the partition, and the lens mount and closure, are made of non-metallic sheet material, which is lighter and easier to work than metallic sheet material of the same thickness.

11. In a stereoscope and the like, a tube having a light admitting end and an opposite viewing end, a transverse frame having borders secured to light admitting end portions of the tube, a light diffusing sheet extending across and having borders secured to the frame, and the tube including a side wall having formed therein a stereographic transparency slide entrance adjacent the frame and light diffusing sheet, a partition dividing the tube into side by side longitudinally extending light compartments terminating within the tube at one end in unobstructing relation with the entrance and at the other end adjacent the viewing end of the tube, transverse walls spaced from the frame and forming therewith stereographic transparency slide grooves extending from the entrance, a lens mount and closure extending across the viewing end of the light compartments, the lens mount and closure having formed therein a pair of apertures, each aperture being at the viewing end of one of the light compartments, and a lens in each aperture.

12. In a stereoscope and the like, a tube having a light admitting end and an opposite viewing end, a transverse frame having borders secured to the tube adjacent the light admitting end, and the tube including a side wall having formed therein a stereographic transparency slide entrance one side of which is formed by one side of the frame, a partition dividing the tube into side by side longitudinally extending light compartments terminating within the tube at one end in unobstructing relation with the entrance and at the other end adjacent the viewing end of the tube, transverse walls spaced from the frame and forming therewith stereographic transparency slide grooves extending from the entrance, a lens mount and closure extending across the viewing end of the light compartments, the lens mount and closure having formed therein a pair of apertures, each aperture being at the viewing end of one of the light compartments, and a lens in each aperture.

13. In a stereoscope and the like, a tube having a light admitting end and an opposite viewing end, a transverse frame having borders secured to the tube adjacent the light admitting end, a light diffusing sheet extending across and having borders secured to the frame, and the tube including a side wall having formed therein a stereographic transparency slide entrance one side of which is formed by one side of the frame, a partion dividing the tube into side by side longitudinally extending light compartments terminating within the tube at one end in unobstructing relation with the entrance and at the other end adjacent the viewing end of the tube, transverse walls spaced from the frame and forming therewith stereographic transparency slide grooves extending from the entrance, a lens mount and closure extending across the viewing end of the light compartments, the lens mount and closure having formed therein a pair of apertures, each aperture being at the viewing end of one of the light compartments, and a lens in each aperture.

14. In a stereoscope outer box sub-assembly and the like, five side by side walls having fold lines between adjacent walls, the side by side walls being folded on the fold lines and the outer walls being connected with each other to form a rectangular tube, one of the walls of the tube with two fold lines having an end inwardly offset from the similar ends of the other three walls of the tube and forming a notch between the adjacent longer walls for providing a stereographic transparency slide entrance, the longer tube wall opposite the notch forming a stop for the slide in the formed tube.

15. In a stereoscope outer box sub-assembly and the like, five side by side walls having fold lines between adjacent walls, the side by side walls being folded on the fold lines and the outer walls being connected with each other to form a rectangular tube, one of the walls of the tube with two fold lines having an end inwardly offset from the similar ends of the other three walls of the tube and forming a notch between the adjacent longer walls for providing a stereographic transparency slide entrance, the longer tube wall opposite the notch forming a stop for the slide in the formed tube, and one of the walls at one side of the notch extending beyond the ends of the notched wall and the stop wall and having an end fold line and a rectangular frame beyond and folded on the end fold line.

16. In a stereoscope outer box sub-assembly and the like, five side by side walls having fold lines between adjacent walls, the side by side walls being folded on the fold lines and the outer walls being connected with each other to form a rectangular tube, one of the walls of the tube with two fold lines having an end inwardly offset from the similar ends of the other three walls of the tube and forming a notch between the adjacent longer walls for providing a stereographic transparency slide entrance, the longer tube wall opposite the notch forming a stop for the slide in the formed tube, and one of the walls at one side of the notch extending beyond the ends of the notched wall and the stop wall and having a first end fold line and a rectangular frame beyond and folded on the first end fold line, and the other wall at the other side of the notch extending beyond the end of the notch wall and the stop wall and having a second end fold line and a connector flap beyond and folded on the second end fold line for securing with the frame.

ROBERT E. McCLURE.